Nov. 30, 1926.
A. E. MILLER
1,609,092
AUTOMATICALLY VARIABLE CRANK MOTION
Filed Jan. 25, 1926   2 Sheets-Sheet 2
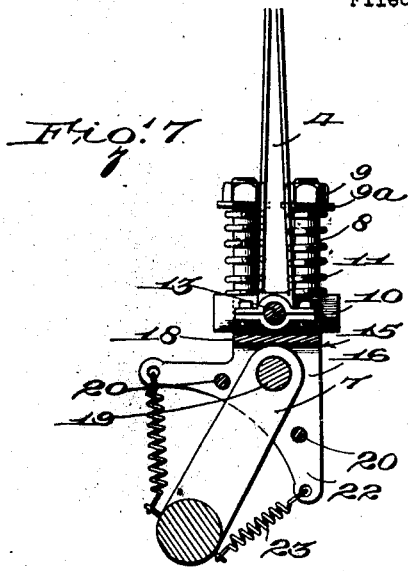
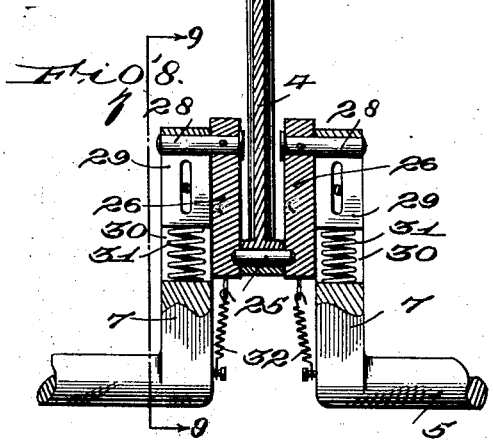
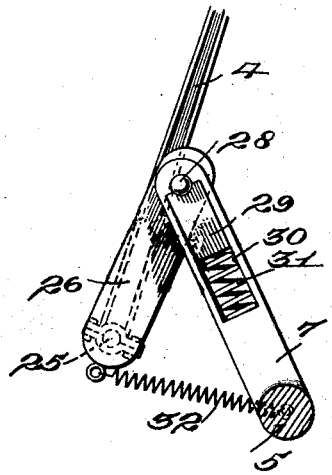
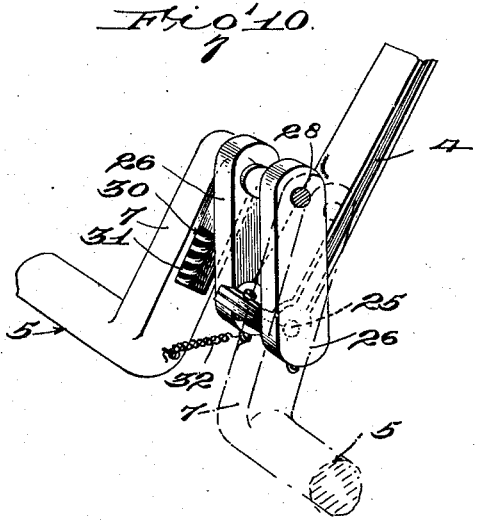
Inventor
Arthur E. Miller
By Smith & Michael.
Attorneys Patented Nov. 30, 1926.

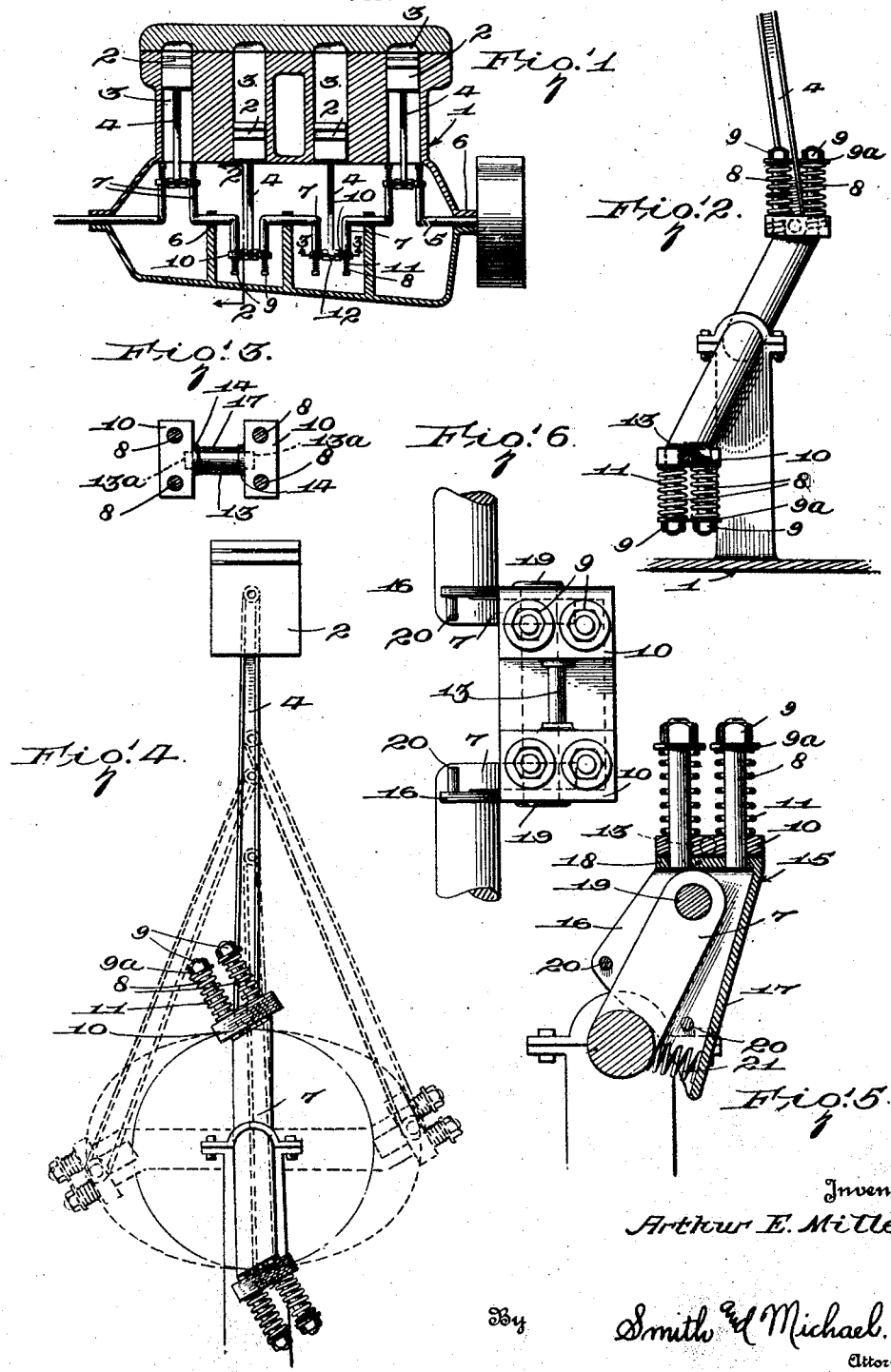

1,609,092

UNITED STATES PATENT OFFICE.

ARTHUR E. MILLER, OF SACRAMENTO, CALIFORNIA.

AUTOMATICALLY-VARIABLE CRANK MOTION.

Application filed January 25, 1926. Serial No. 83,570.

My invention relates to an automatically variable crank motion especially designed for use with automobile engines, although also adapted for practically universal use.

The object of my invention is to provide an automatically variable crank motion which operates to increase the effective leverage of the crank shaft under heavy loads or when the load exceeds a predetermined value. In this way the flexibility of the power plant is increased and the necessity of providing or using selective types of gear transmission is avoided. In other words, the present invention relieves the driver of a motor car on which it is mounted, of the necessity of shifting gears, as the crank motion proposed by the present invention automatically varies the effective leverage of the crank shaft in accordance with the load. Thus, when starting or travelling up a hill, the abnormally heavy load imposed upon the crank shaft automatically increases the effective leverages of the crankshaft, thereby serving substantially the same purpose as the low gear set of a transmission gearing. As soon as the load decreases to normal, the normal leverage of the crank shaft is resumed and thus the same effect is had as though the high speed gear set of a transmission gearing had been brought into use.

Other objects and advantages reside in certain novel features of construction, arrangement and combination of parts which will be hereinafter more fully described and particularly pointed out in the appended claims, reference being had to the accompanying drawings forming part of this specification and in which:

Figure 1 is a diagrammatic sectional view of an engine, showing in elevation one embodiment of the present invention applied thereto;

Figure 2 is an enlarged sectional view on line 2—2 of Figure 1;

Figure 3 is a detail view in section on line 3—3 of Figure 1, showing a wrist pin mounting;

Figure 4 is a view in elevation showing a piston and connecting rod and the crank motion embodying the present invention and illustrating different phases in the cycle of operation;

Figure 5 is a fragmentary view, partly in elevation and partly in section, showing a modified form of the invention;

Figure 6 is a plan view of the device shown in Figure 5.

Figure 7 is a fragmentary view, partly in transverse section and partly in side elevation, showing another form of the invention;

Figure 8 is a fragmentary view partly in longitudinal section and partly in front elevation showing another form of the invention;

Figure 9 is a sectional view on line 9—9 of Figure 8; and,

Figure 10 is a fragmentary detail perspective view further illustrating the form of the invention shown in Figures 8 and 9.

Referring to the drawings, and more particularly to Figure 1, an engine which may be of any type, is shown diagrammatically at 1, and has pistons 2 operating in its cylinders 3 and connected to connecting rods 4. A crank shaft, designated generally at 5, is provided and is rotatably mounted in suitable crank shaft bearings 6. The crank shaft 5 has a number of pairs of crank arms 7, there being one pair of crank arms 7 for each connecting rod 4.

In the embodiment of the invention shown in Figures 1 to 4, inclusive, each crank arm 7 has a pair of parallel guide stems or bolts 8 secured to the outer ends thereof and having heads 9 at their outer ends. A slide block 10 is slidably fitted on each pair of guide stems 8. A spring 11 encircles each guide stem and abuts the block 10 at one end and at its opposite end abuts a washer 9ª engaged with the head 9. The springs 11 are sufficiently heavy and under sufficient tension to hold the blocks 10 against the crank arm with which they are associated under normal load, but are designed to yield when the load exceeds a predetermined amount or value. Each connecting rod 4 has a bearing 12 in which a pivot pin 13 is mounted. The ends of each pivot pin projects beyond its bearings and the projecting ends 13ª are received in sockets or bearings 14 provided therefor in the associated slide blocks 10. As illustrated to advantage in Figures 2 and 4 of the drawing, the guide stems 8 preferably extend angularly or at an inclination from the outer ends of the crank arms 7 on which they are carried.

In operation the lower ends of the connecting rods 4 revolve about the axis of the crank shaft 5 in the path of a circle of uniform radius under ordinary or normal loads, the path described by the axis of the pivot pin 13 of one connecting rod being indicated by dot and dash lines in Figure 4. When the load exceeds a predetermined amount, as, in the instance of an automobile engine, when the same is starting or the vehicle is climbing a hill, the springs 11 yield and this increases the radius of movements of the connecting rods 4 in certain phases of their angular movement, as indicated by the dotted lines in Figure 4. However, as soon as the load again becomes normal, the connecting rods resume their normal movements. The entire operation is automatic and has the advantage of automatically varying the effective leverage of the crank shaft to meet the requirements of the load imposed thereon.

In the form of the invention shown in Figures 5 and 6, in lieu of mounting the guide stems 8 on the outer ends of the crank arms 7, these guide stems are mounted on a cross plate 18 of a rocker element designated generally at 15. The rocker element 15 includes end plates 16, a side plate 17 and a cross plate 18. The end plates 16 are pivoted to the crank arms 7 by means of a pivot 19 and the rocking movement of the entire rocker element is limited by means of stop pins 20 carried by the end plates 16 and engageable with the crank arms. A spring 21 coacts with the crank shaft and with the side plate 17 to resist rocking movement of the rocker element. In this form of the invention, the slide blocks 10 are pivotally connected to the connecting rods and are mounted on the guide stems 8 and controlled by the springs 11, just as in the embodiment first described.

The form of the invention shown in Figure 7 is identical with that shown in Figures 5 and 6 and the description above applies thereto, with the exception that the rocker 15 has its plate 17 omitted, and in lieu thereof arms 22 are provided on the end plates. The spring 21 is also omitted and in place of the same retractile core springs 23 cooperable with the crank shaft and arms 22 are provided.

In the form of the invention shown in Figures 8, 9 and 10, the lower end of the connecting rod 4 is pivotally connected as at 25 to the inner end of a rocker element made up in this instance of a pair of links or rocker arms 26. The outer ends of the rocker arms 26 are pivotally connected to the crank arms 7 by means of pivot pins 28 traversing the rocker arms 26 and engaged with bearings 29 slidably fitted in elongated bearing openings 30, provided in the crank arms 7, though yieldably held in one position in said openings by means of coil springs 31. Coil springs 32 are connected with the rocker arms 26 and with the crank shaft 5 and are designed and tensioned to hold the rocker arms 26 aligned with and in the plane defined by the crank arms 7 until the load exceeds a predetermined value. As long as the rocker arms 26 are aligned with and in the plane defined by the crank arms 7, the lower ends of the connecting rod revolve in the path of a circle of uniform radius and this occurs under normal loads below a predetermined value. When, however, the load exceeds a predetermined value, the springs 32 yield and this results in an increase of the radius of movement of the connecting rods whereby the effective leverage of the crank shaft is increased to the end of better dealing with the requirements of the increased loads. As in the other embodiments of the invention, this variation of the effective leverage of the crank motion is entirely automatic.

While I have elected to disclose and describe my present invention as used in connection with the conventional internal combustion engine, it should be understood that the same is for the purpose of illustration only, and that the underlying principles of construction and operation are by no means limited to this particular use, but may be employed in connection with any crank motion for changing reciprocating movements into rotary motion where it is desired to automatically vary the effective leverage of the crank shaft, dependent upon the power requirements of the machine or power plant.

Having thus described my invention, what I claim as new and desire to secure by Letters Patent is:—

1. An automatically variable crank motion comprising a crank shaft having a pair of crank arms, a connecting rod associated therewith, rocker arms having their outer ends pivotally connected to the outer ends of the crank arms and terminating intermediate the ends of the crank arms, a pivotal connection between the inner ends of the rocker arms and the connecting rod, and spring means for holding the rocker arms in the plane defined by the crank arms until the load exceeds a predetermined amount.

2. An automatically variable crank motion comprising a pair of crank arms, rocker arms, a pivotal and limited sliding connection between the outer ends of the rocker arms and the crank arms, the inner ends of the rocker arms terminating intermediate the ends of the crank arms, a connecting rod pivotally connected to the inner ends of the rocker arms, and spring means for holding the rocker arms in the plane defined by the crank arms until the load exceeds a predetermined amount.

3. An automatically variable crank motion comprising a pair of crank arms, rocker arms, slidable bearings in the outer ends of the crank arms, springs yieldably maintaining the bearings in one position, pivotal connections between the outer ends of the rocker arms and the bearings, the rocker arms terminating intermediate the ends of the crank arms, a connecting rod, a pivotal connection between the connecting rod and the inner ends of the rocker arms, and spring means for holding the rocker arms in the plane of the crank arms until the load exceeds a predetermined amount.

In testimony whereof I hereunto affix my signature.

ARTHUR E. MILLER.